United States Patent Office.

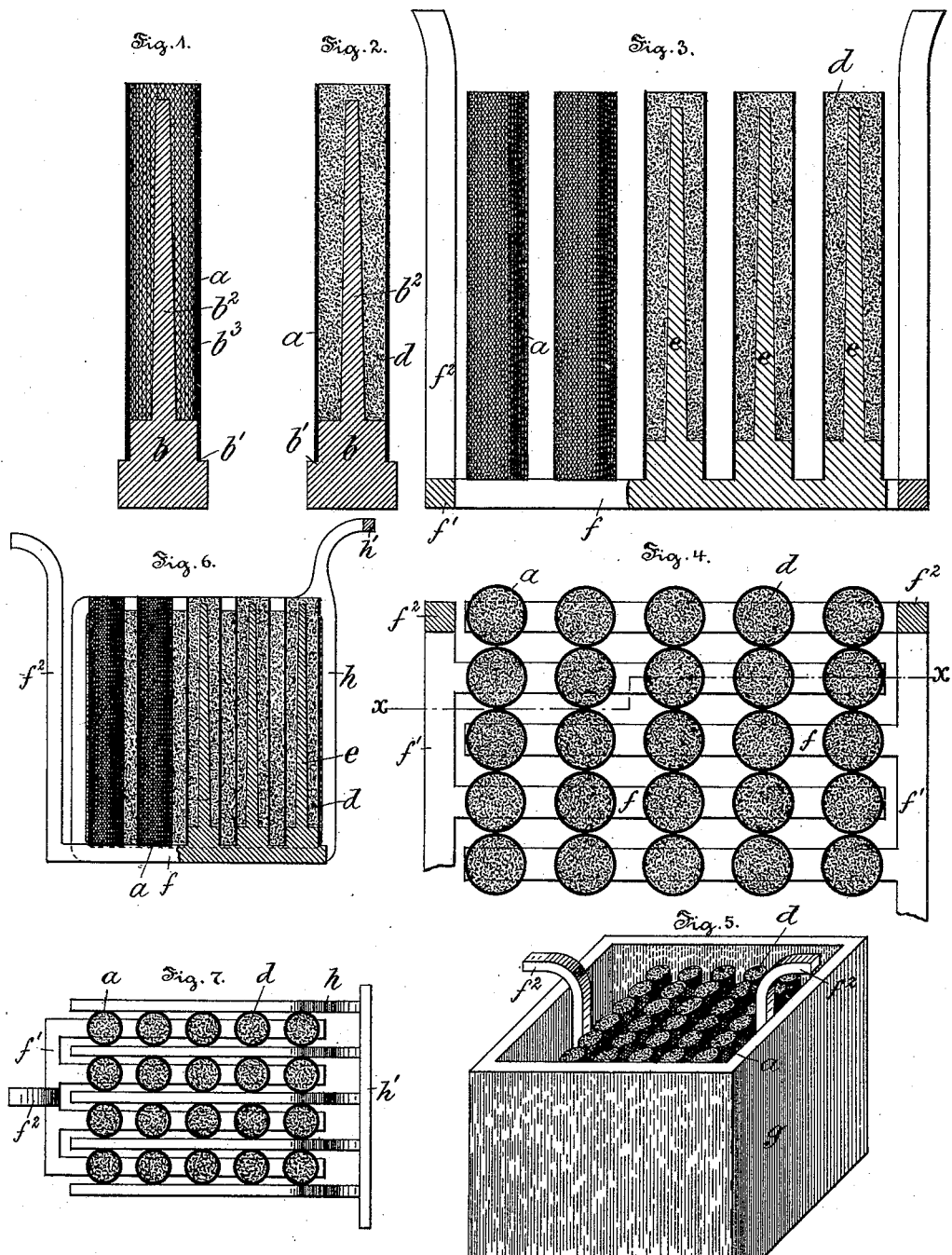

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

SECONDARY BATTERY.

SPECIFICATION forming part of Letters Patent No. 447,279, dated February 24, 1891.

Application filed November 18, 1890. Serial No. 371,828. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Secondary or Storage Batteries, of which the following is a specification.

My present invention relates to the electrodes or elements of a secondary or storage battery, and more particularly to the composition, construction, and arrangement thereof.

It is well known by electricians that the result of repeatedly charging and discharging the elements of a secondary or storage battery is to cause the elements, and more especially the positive ones, to disintegrate or scale off, so that the active material is loosened and separated from the central portions thereof, and in falling to the bottom of the cell impairs the efficiency of the battery by short-circuiting the elements and in other well-understood ways.

The principal object of the present invention is to prevent the active material, or material adapted to become active, susceptible of being used for the storage of electric energy from becoming detached from its support, and consequently to obviate short-circuiting of such elements mounted in battery, whereby the life of the same is prolonged and the efficiency of the battery increased.

My invention consists of a battery element comprising an interior support provided with a shoulder, an exterior woven tube fitting onto said shoulder and extending beyond said support, and a porous metallic substance or materials cast within said tube and around said support.

My invention further consists of an electrode comprising a lead or other connection having lugs or other terminal devices and supports cast therewith and woven tubes of insulating material mounted on said supports, and having a metallic salt or salts cast within said tubes and reduced to a porous crystallized metallic state or condition for use.

My invention further consists of a secondary battery having as the positive elements thereof a series of supports cast integral with lead or other connections and terminal devices, and provided with woven tubes mounted thereon and filled with a cast porous metallic material or materials, and having as the negative elements thereof a series of similar elements or a series of lead plates; and my invention further consists of the improvements in a secondary or storage battery hereinafter described, and pointed out in the claims.

In producing elements embodying my invention use is made of woven tubes of asbestus or other suitable material. These tubes are placed upon a brass rod provided with a shoulder adapted for their reception and with a tapering projection or core of less diameter than the interior of the tubes, so that a space is afforded between the core and the inner walls of the tube. This space serves as a mold into which fused chloride of lead or salt, or salts of other metals or materials is or are poured. When the mass has become cool, the brass rod is withdrawn, leaving a cavity or matrix in the center of the cast mass. A series of these partially-completed elements is then placed in a suitable appliance or mold and molten lead or other suitable metal is poured into the cavities or matrices formed by the withdrawal of the brass cores and which constitutes a central conducting-support for the elements. All these central supports may be united by means of a connection provided with a lug or other terminal device, so as to constitute an electrode which may be readily mounted in a battery cell or vase. After the cast metallic mass has been reduced either chemically or electrolytically, or by both modes of treatment, to the metallic state or condition in order to constitute the active material of the element the same can be mounted in battery for use.

The nature and characteristic features of my invention will be more fully understood from the following description, taken in connection with the accompanying drawings, forming part hereof, and in which—

Figure 1 is a transverse section of a metallic rod provided with a shoulder and with a core, and showing a surrounding tube of woven material applied thereto, so as to form a mold for the reception of the molten metallic salts adapted to be reduced to a state to constitute the active material or portion of the element. Fig. 2 is a similar view showing the tube filled with the cast salts of a material adapted to be reduced to a metallic state to constitute the active material or part of the element. Fig. 3 is a view on the line $x\,x$ of Fig. 4, showing to the left an elevation and to the right a section of an electrode comprising a series of elements embodying the particular features of my invention and attached to connections having terminal lugs formed integral therewith. Fig. 4 is a top or plan view of two electrodes comprising several series of elements embodying my invention and attached to the respective arms of two connections provided with terminal lugs and arranged for use in a battery-cell. Fig. 5 is a perspective view of a battery-cell, showing my invention in application. Fig. 6 is a view, partly in elevation and partly in section, of a portion of a battery-cell having my improved elements and connections, as the positive electrode and ordinary lead plates, connected by a conductor as the negative electrode thereof; and Fig. 7 is a top or plan view thereof.

In the drawings, $a$ is a tube of woven material, as asbestus.

$b$, Figs. 1 and 2, is a brass or other rod provided with a shoulder $b'$ for the reception of the tube $a$ and with a tapering projection or core $b^2$. This core $b^2$ extends upward nearly to the top of the tube $a$ and is of less diameter than the tube, so as to afford an annular space $b^3$ between the interior walls of the tube and core. This annular space $b^3$ constitutes a mold for the reception of the fused salts of a metallic material or materials, as the chloride of lead or the chlorides of other metals, which, when reduced to the metallic state, constitutes the porous crystallized active portion or material $d$ of the element.

$e$ is a central support, formed by casting suitable material, as lead, into the matrix or cavity formed by the removal of the brass rod $b^2$.

$f$ is a connection provided with arms $f'$ and with terminal lugs $f^2$, and preferably cast integral with the supports $e$.

$g$ is a battery cell or vase of the usual or of any preferred construction.

$h$ is a lead plate or element.

$h'$ is a conductor attached to and connecting the plates $h$.

In order that the nature and characteristic features of an element embodying my invention may be fully understood, a brief description of the process of manufacturing the same will now be given.

The tube $a$, of woven asbestus or other suitable material, is fitted onto the shoulder $b'$ of the rod $b$, and the fused salts of a metallic material or materials, as chloride of lead, is or are poured into the space $b^3$ between the core $b^2$ and the tube $a$ and the mass then allowed to cool and crystallize therein. It may be remarked that in practice the fused material in cooling becomes firmly embedded in and attached to the meshes of the tube $a$, thereby increasing the mechanical strength and durability of the element. The central rod $b$ is then withdrawn from the cast mass and the cavity or matrix formed by its withdrawal is filled with fused lead or other suitable conducting material, which constitutes a central support for the element. The salts of the metallic material or materials is or are then reduced to the metallic state by electrolysis or in any other preferred manner to constitute the porous crystallized portion $d$ of the element.

In use two connections $f$, provided with terminals $f^2$ and with arms $f'$, attached to the supports $e$ of a series of elements, are mounted in a vase or cell $g$, so as to constitute the positive and negative electrodes of a secondary or storage battery, as will be readily understood by reference to Figs. 3, 4, and 5; or, if preferred, my improved elements and connections therefor may be employed as the positive electrode in connection with a negative electrode comprising a series of lead or similar plates $h$, connected together by a conductor $h'$, as shown in Figs. 6 and 7.

The tubes $a$ not only serve to form a mold, as has been explained, but also to prevent the active material from falling away from the elements. Moreover, these tubes in use insulate the positive and negative elements from each other and permit of the free access of the electrolyte to all parts of the active surface of the elements constituting the positive and negative electrodes of the battery.

Having thus described the nature and objects of my invention, what I claim as new, and desire to secure by Letters Patent, is—

1. A battery element comprising an interior support, an exterior insulating woven tube fitted onto said support, and an integral mass of metallic material or materials cast within said tube and around said support, substantially as and for the purposes set forth.

2. A battery element comprising a conducting-support, an exterior tube of woven asbestus fitting onto said support, and a metallic salt cast within said tube and around said support, substantially as and for the purposes set forth.

3. A battery element comprising an interior conducting-support provided with a shoulder, an exterior woven insulating-tube fitting thereon and extending beyond said support, and metallic material cast within said tube around said support and in contact with the meshes of said woven tube and adapted to become the active material of said element, substantially as and for the purposes set forth.

4. A battery electrode comprising a connection provided with a lug or other terminal device and with supports, woven insulating-tubes mounted on said supports, and metallic material cast between said supports, and wholly or partially filling the meshes or interstices of said woven tubes, substantially as and for the purposes set forth.

5. A battery electrode comprising a lead connection provided with a lug or other terminal device and with supports, woven asbestus tubes mounted on said supports, and a salt of lead cast between said supports and tubes and adapted to become porous and metallic, substantially as and for the purposes set forth.

6. A battery electrode comprising a connection provided with a lug or other terminal device and with arms, supports cast integral with said arms, woven tubes mounted on said supports, and a material cast between said supports and tubes and adapted to become porous and metallic, substantially as and for the purposes set forth.

7. The combination of a vase or cell, an electrolyte, two series of supports cast integral with connections, and woven insulating-tubes mounted on said supports and filled with porous crystallized metallic material or materials, substantially as and for the purposes set forth.

8. The combination, in a secondary battery, of a cell, a suitable electrolyte, one electrode provided with connections, supports, woven insulating-tubes and cast crystallized porous material or materials, and the other electrode composed of a series of lead or other plates, substantially as described.

9. A battery element comprising a core of conducting material, having a metallic mass cast around the same, and surrounded by a tubular woven insulating fabric, substantially as and for the purposes set forth.

In witness whereof I have hereunto set my signature in the presence of two witnesses.

STANLEY CHARLES CUTHBERT CURRIE.

Witnesses:
   THOMAS M. SMITH,
   RICHARD C. MAXWELL.